United States Patent [19]
De' Longhi

[11] Patent Number: 5,941,407
[45] Date of Patent: Aug. 24, 1999

[54] SAFETY CAP FOR PRESSURIZED CONTAINERS

[75] Inventor: Giuseppe De' Longhi, Treviso, Italy

[73] Assignee: De' Longhi S.P.A., Treviso, Italy

[21] Appl. No.: 08/650,134

[22] Filed: May 17, 1996

[30] Foreign Application Priority Data

May 23, 1995 [IT] Italy .................................. MI950345 U

[51] Int. Cl.⁶ .................................................. B65D 51/00

[52] U.S. Cl. ................... 220/316; 220/251; 220/DIG. 32

[58] Field of Search ............................... 220/378, 203.09,
220/203.1, 203.19, 230.2, 203.25, 203.26,
203.27, 203.29, 240, 246, 250, 251, 255,
256, 303, 316, 367.1, 89.1, DIG. 32, DIG. 17;
215/260, 262, 270; 277/549, 551, 572,
573, 343, 344, 909

[56] References Cited

FOREIGN PATENT DOCUMENTS 0 400 514   5/1990   European Pat. Off. .
94 07 699  11/1994   Germany .

*Primary Examiner*—Stephen K. Cronin
*Assistant Examiner*—Nathan Newhouse
*Attorney, Agent, or Firm*—Herbert Dubno

[57] ABSTRACT

A safety cap for pressurized containers includes a closure member (2) of the aperture (3) of the container (4) and a grip member (5) having a connecting means (6) with the closure member for removing the closure member from the aperture only when the pressure inside the container is at a preset value. A safety device (7) is adapted to slide inside the closure member (2) from a first position to a second position and vice versa, for activating and disactivating the connecting means as the pressure varies, and seal means (8) between the closure member and at least a first and a second region of the safety device.

7 Claims, 2 Drawing Sheets

SAFETY CAP FOR PRESSURIZED CONTAINERS

FIELD OF THE INVENTION

The present invention relates to a safety cap for pressurized containers.

BACKGROUND OF THE INVENTION

Several types of safety caps for pressurized containers are known.

Generally, conventional safety caps comprise a closure member of the aperture of the container and a grip member which, depending on the pressure level inside the container, can rotate freely with respect of the closure member in order to prevent the removal of the cap when the pressure is too high.

By contrast, when the pressure inside the container is low, or at any rate below a dangerous value, the grip member is rigidly associated with the closure member by connecting means adapted to allow the user to remove the cap.

The connecting means between the grip member and the closure member of the safety cap can be activated by the motion of a slider inside the cap by the pressure generated inside the container.

When the pressure increases, the slider can be moved upwardly, against the force of an elastic means, thereby disactivating the connecting means and making the grip member free to rotate with respect of the closure member.

When the pressure decreases to an acceptable level which is no longer dangerous, the slider is lowered by the elastic means thereby activating the connecting means which allows the rotation of the closure member, through the rotation of the grip member, for removing the closure member from the aperture of the container.

In conventional safety caps, the seal between the slider and the closure member is usually provided by an O-ring.

It is apparent that, after a while, the O-ring will not guarantee a perfect seal between the surfaces of the slider and of the closure member allowing more or less vapor to escape.

While inconvenience may seem to be of no consequence, it actually completely impairs the correct operation of the safety cap.

In fact, the displacement of the slider by the elastic means, such as a spring, is modified by the pressure inside the container which is in turn modified by the leaks between the slider and the closure member.

In other words, the pressure inside the container may not reach a value high enough to allow the slider to move upwardly against the elastic means preventing a secure disengagement between the grip member and the closure member which may be removed from the container with fatal consequences.

Furthermore, when the vapor leaks between the slider and the closure member surfaces, it tends to condense and leave calcareous deposits on the same surfaces, on the O-ring and on the connecting means which eventually impair the correct operation of the cap.

OBJECTS OF THE INVENTION

The object of the present invention is to eliminate the above described drawbacks of the prior art.

Another object of the invention is provide a safety cap for pressurized containers having seal means between the slider and the closure member adapted to prevent any leak between their surfaces even after long use.

A further object of the invention is to provide a safety cap which maintains constant operation settings as established at manufacture.

Still a further object of the invention is to provide a cap for pressurized containers wherein the means connecting the closure member with the grip member remains free from calcareous deposits and therefore does not deteriorate or break.

Still a further object of the invention is to provide a cap having reliable operation with an extremely simple structure and therefore with a low cost.

SUMMARY OF THE INVENTION

The above other objects are achieved by a safety cap for pressurized containers comprising a closure member for closing the container aperture and a grip member having a connecting means with the closure member for enabling removal of the closure member from the aperture only when the pressure inside the container has a preset value, a safety device being slideable inside said closure member from a first position to a second position, and vice versa, for activating and disactivating said connecting means as the pressure varies, and a seal means between said closure member and at least a first and second region of said safety device.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
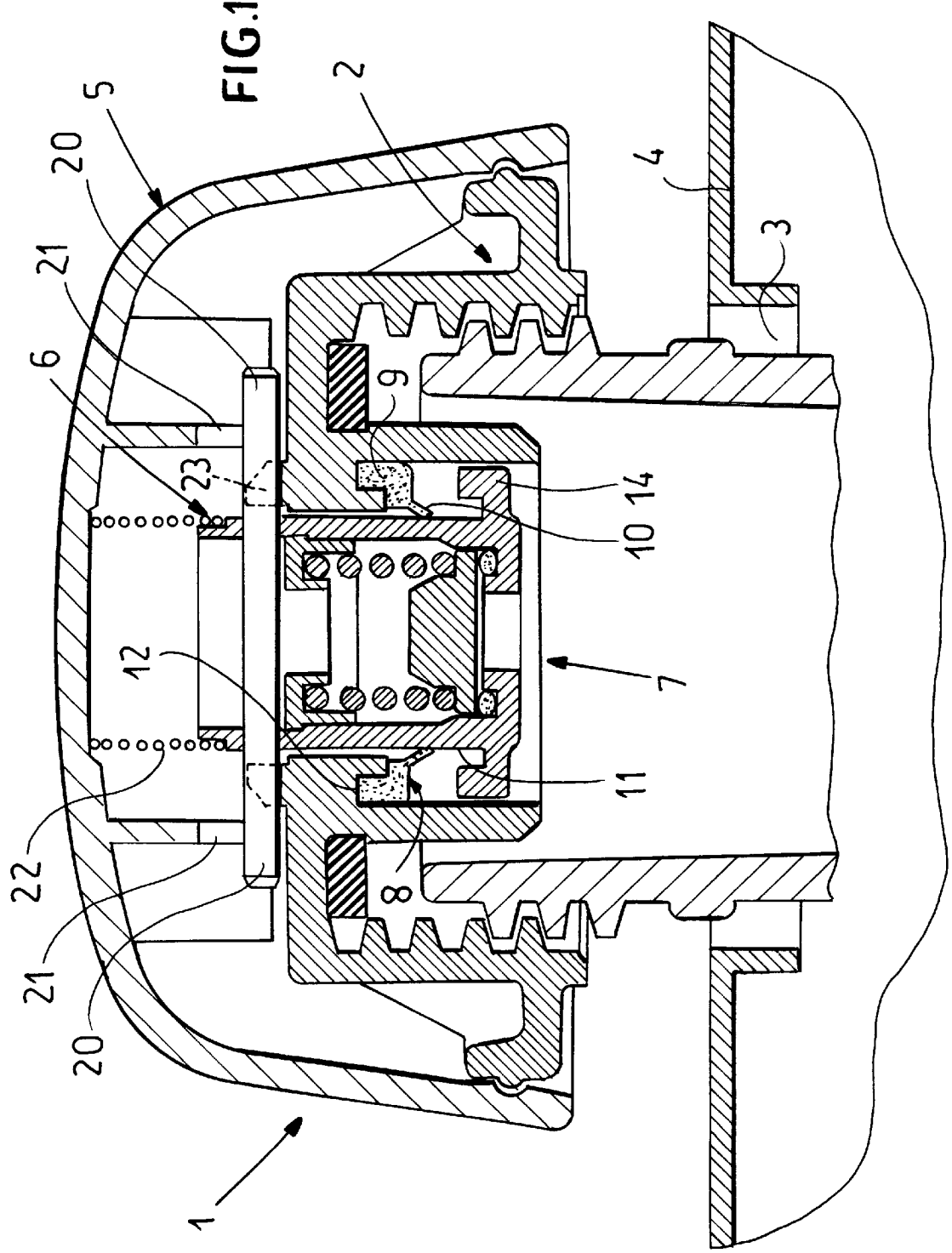
FIG. 1 is a cross sectional view through the safety cap according to the invention, wherein the grip member and the closure member are connected together.

The safety cap according to the invention, generally designated by the reference numeral 1, comprises a closure member 2 of the aperture 3 of a pressurized container 4.

Closure member 2 is contained inside a grip member 5 and is connected or disconnected thereto by a connecting means 6 so that the closure member may be removed from aperture 3 only when the pressure inside container 4 is at a selected value.

Inside closure member 2, a safety device 7 can slide between a first position and a second position for activating or disactivating the connecting means 6, as the pressure varies inside container 4.

Figure 2:
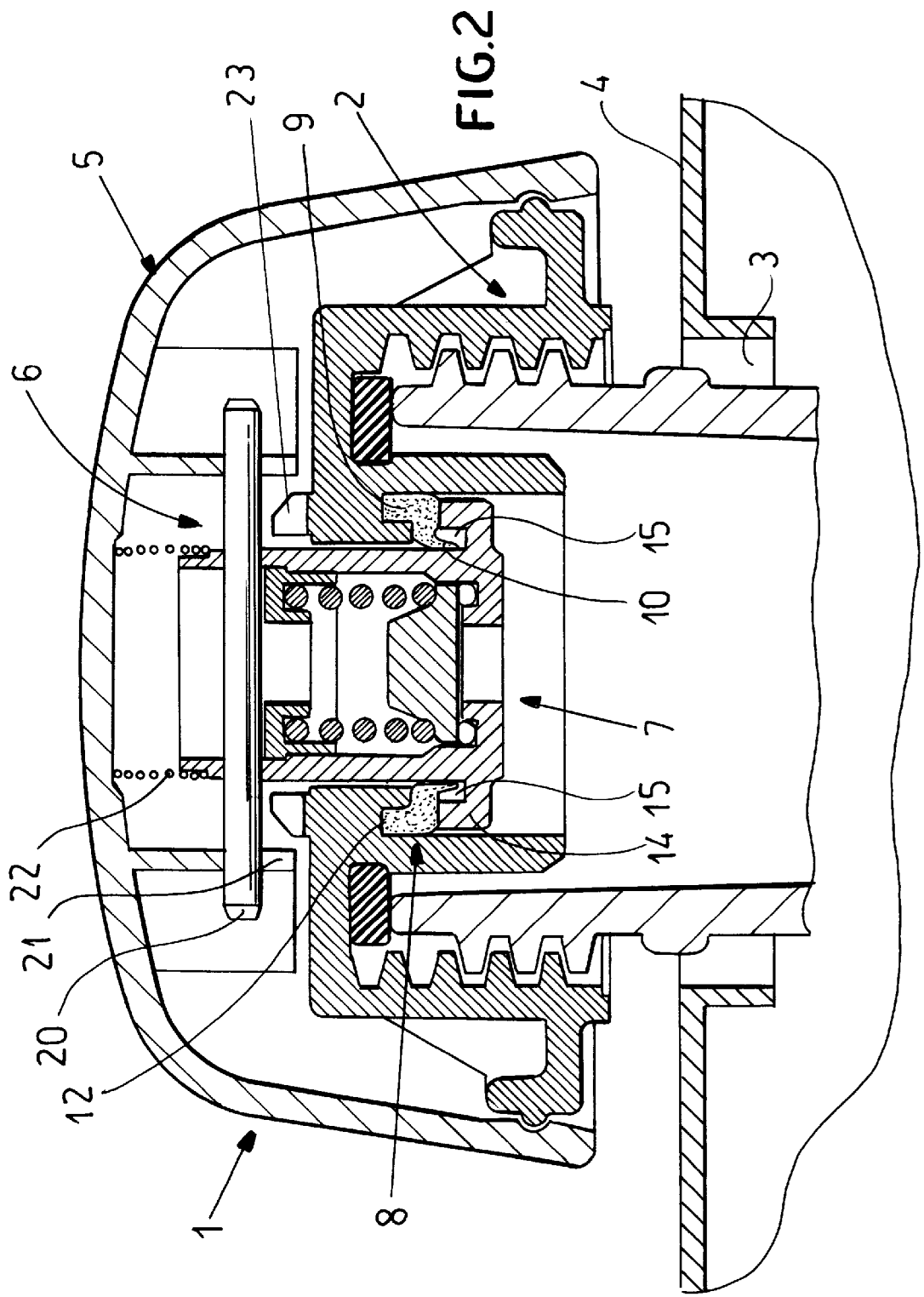
FIG. 2 is a similar view of the cap according to FIG. 1 wherein the grip member and the closure member are disconnected, according to the invention.

At rest, when there is no pressure inside the container, safety device 7 assumes the second position, as shown in FIG. 1, while when there is pressure inside container 4, the safety device moves to a first position, as shown in FIG. 2, wherein the grip member can freely rotate above closure member 2.

Advantageously, the safety cap has a seal means, formed by a seal or gasket 8, between closure member 2 and at least a first and a second regions of safety device 7.

In particular, seal 8 has a sealing pressure on member 7 which varies with pressure inside container 4.

Seal 8 has a circular main body which comprises an enlarged edge 9, on a first face, and a flexible rim 10, on a second face. Flexible rim 10 acts on the first region of the safety device defined by an external wall 11 of the safety device, while enlarged edge 9 is arranged in an annular seat 12 of closure member 2.

The second seal region of the closure member, with safety device 7, is defined by an annular flange 14 engaging the second face of seal 8 when the closure member is in the first position (FIG. 2), wherein grip member 5 is freely rotatable with respect of closure member 2. The edge 10 then lies in the compartment 15.

Safety device 7 also has an annular compartment 15 comprised between external wall 11 and bracket 14. Edge 10 lies outside annular compartment 15 when the closure member is in the second position (FIG. 1) and the grip member is rigidly associated with the closure member whereby the rotation of the grip member allows the closure member to be removed from aperture 3 of container 4.

Seal 8 acts in the first region defined by wall 11 along a first direction which is substantially perpendicular to the sliding direction of the safety device inside closure member 2, while in the second region, defined by flange 14, and by the second face of seal 8, the seal is provided in a direction which is substantially parallel to the sliding direction of the safety device.

This particular configuration allows seal 8 to act sequentially in the first and second regions in order to prevent any leak between the closure member and safety device 7, even after a long use.

Connecting means 6 comprises a bar 20 which is movable inside a seat 21, defined in the grip member 5, and is biased by elastic means, namely a preset spring 22.

Bar 20 moved by safety device 7 raising or lowering from the first position to the second position, and vice versa, in order to engage or disengage teeth 23 provided on the closure means.

The operation of the safety cap for pressurized containers, according to the invention, is apparent from the above description.

Namely, when there is no pressure in container 4, safety device 7 is in the second position, shown in FIG. 1, and is lowered by the action of spring 22.

In this situation, grip member 5 is rigidly associated with, and is constrained to rotate with closure member 2 because bar 20 is at the same time engaged with seat 21 and teeth 23 of the two elements; edge 10 of seal 8 provides for the seal on wall 11 of the safety device.

When the pressure inside container 4 rises, flexible edge 10 will increase the seal on wall 11 proportionally to the increase of pressure.

As the pressure increases, safety device 7 starts to rise compressing spring 22 and increasing the sealing force on wall 11.

When the pressure has reached a selected value, safety device 7 will be in the first position (as illustrated in FIG. 2) wherein bar 20 is completely disengaged from teeth 23 and the grip member is free to rotate with respect to closure member 2.

In this position, a second seal is provided, between the closure member and safety device 7, by bracket 14 contacting the second face of seal 8.

In this situation, when the pressure is considered to be dangerous for the user, it is impossible to remove closure member 2 from aperture 3 of container 4 and the seal between safety device and the closure member is ensured by the double contact of the two members.

Should the pressure inside container 4 increase, bracket 14 will further compress seal 8 which will be further deformed thereby ensuring a greater seal both in this second region and in the first region where flexible edge 10 is acting.

In this manner, any possible leak between safety device 7 and the closure member will be prevented until the safety valve is activated.

It has been seen in practice that the safety cap according to the invention is particularly advantageous in providing constant operation during a long time because it is not subject to stretching due to vapor leaks between the moving members or due to calcareous deposits on the connecting means between the grip member and the closure member.

The materials employed, as well as the dimensions, may be any according to the specific needs and the state of the art.

I claim:

1. A safety cap for a pressurizable container, comprising:

a closure member rotatable for opening and closing an aperture of a pressurizable container and removable therefrom only when pressure within said container has a preset value;

a grip member located above said closure member and rotatable relative to said closure member;

an annular slidable safety member in said closure member shiftable in response to the pressure in said container for coupling said grip member to said closure member when said pressure is at said value and decoupling said grip member from said closure member when said pressure is above said value; and a seal between said closure member and said safety member and having a circular body surrounding said safety member, an enlarged edge on one side of said body pressed by said safety member against said closure member in a direction parallel to the displacement of said safety member with increasing pressure in said container, and a flexible rim on an opposite side of said body pressing against a cylindrical surface of said safety member in a direction perpendicular to said displacement.

2. The safety cap defined in claim 1 wherein said seal is constructed and arranged to have a sealing effect which increases with the pressure in said container.

3. The safety cap defined in claim 1 wherein said flexible rim is effective to seal against said cylindrical surface prior to engagement of said safety member with said body opposite said enlarged edge.

4. The safety cap defined in claim 3 wherein said closure member is formed with an annular groove receiving said safety member is formed with an annular groove receiving said enlarged edge and said safety member is formed with an annular flange engageable with said body opposite said enlarged edge.

5. The safety cap defined in claim 4 wherein said flange is provided with an annular compartment receiving said flexible rim when said safety member decouples said grip member from said closure member.

6. The safety cap defined in claim 5 wherein said safety member is provided with a bar movable in said grip member and engageable with teeth on said closure member.

7. The safety cap defined in claim 6, further comprising a spring biasing said safety member into a position in which said bar engages said teeth.

* * * * *